F. D. CLEVELAND.
FISH HANDLING MECHANISM.
APPLICATION FILED NOV. 15, 1911.

1,049,208.

Patented Dec. 31, 1912.
2 SHEETS—SHEET 1.

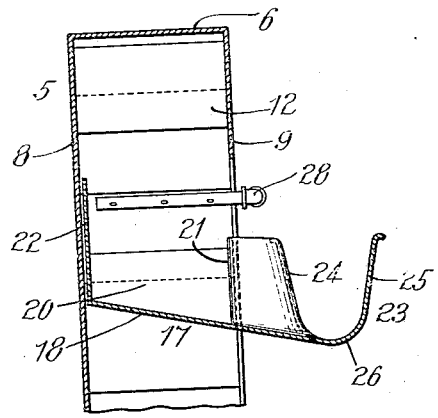
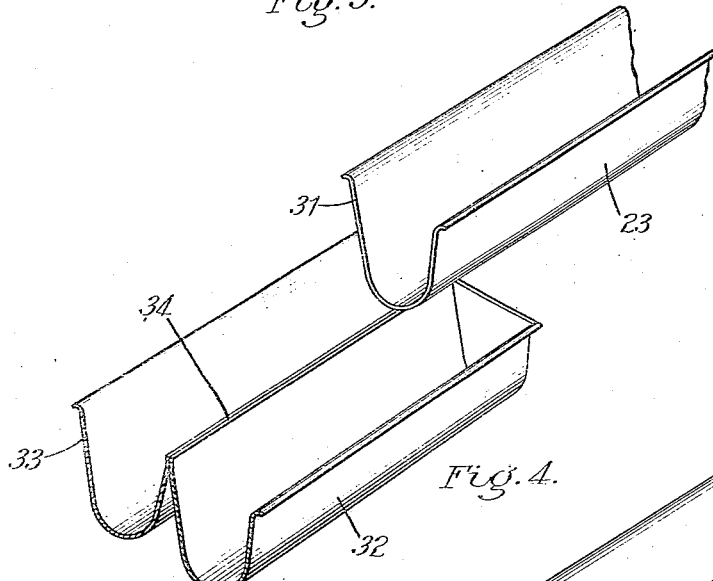
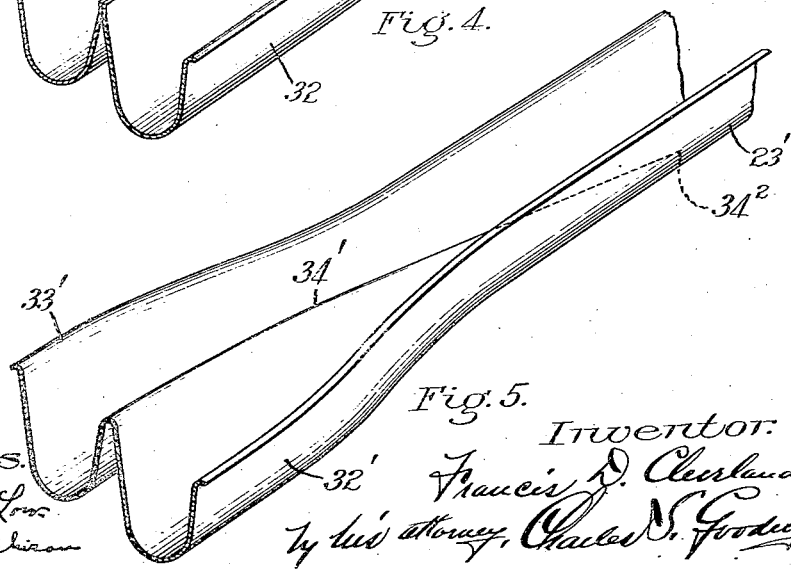

UNITED STATES PATENT OFFICE.

FRANCIS D. CLEVELAND, OF WINCHESTER, MASSACHUSETTS.

FISH-HANDLING MECHANISM.

1,049,208.
Specification of Letters Patent. Patented Dec. 31, 1912.

Application filed November 15, 1911. Serial No. 660,437.

*To all whom it may concern:*

Be it known that I, FRANCIS D. CLEVELAND, a citizen of the United States, residing at Winchester, in the county of Middlesex and State of Massachusetts, have invented new and useful Improvements in Fish-Handling Mechanism, of which the following is a specification.

This invention relates to a device for handling fish, the object of the invention being to take a mass of fish and subdivide said mass into fractional portions thereof in order that the fish may be eventually delivered one by one to mechanism for cutting off the heads and tails of the same.

In handling fish and presenting the same to mechanism for cutting off the heads and tails, it is very desirable and, in fact, essential to the proper working of the cutting machine that the fish should be fed to it regularly or in equal numbers during a certain given time, and in fact it is very desirable that the fish should be fed to the cutting machine one by one.

The invention, while particularly adapted to be used for separating from a mass of fish fractional portions thereof and feeding the same in substantially equal quantities to a cutting machine, may also be used for feeding said fish to other mechanisms than a cutting machine where it is desirable that equal quantities of fish should be delivered in equal periods of time, such, for instance, as in flaking machines where it is desirable that the fish should be fed in equal quantities during equal periods of time and preferably one by one to a mechanism which will place them arranged evenly upon "flakes" in order that they may be dried.

To these ends my invention consists in the combination and arrangement of parts set forth in the following specification and particularly pointed out in the claims thereof.

Figure 1:
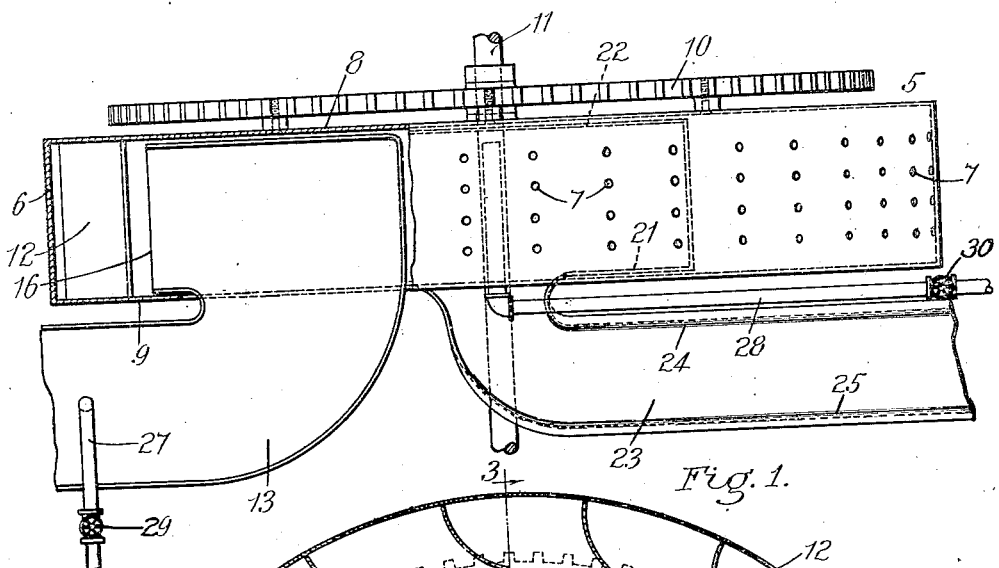
Figure 2:
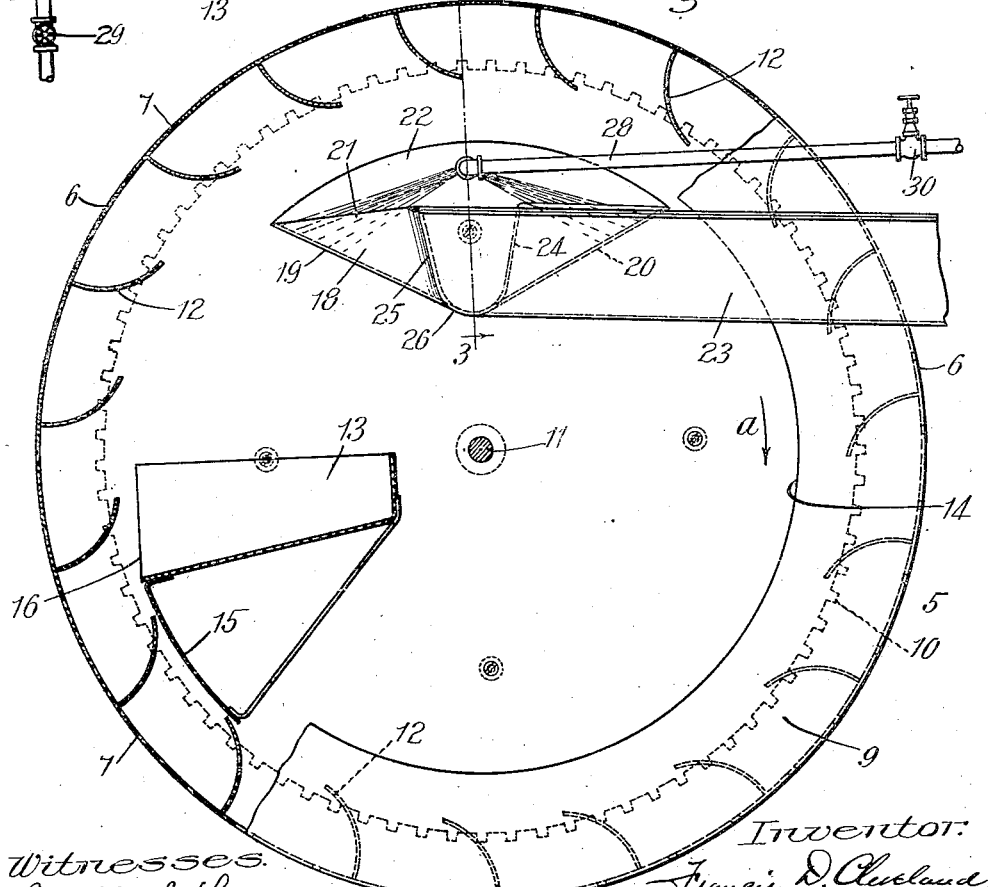

Referring to the drawings: Figure 1 is a plan view of my improved fish handling mechanism partly broken away and shown in section. Fig. 2 is a front elevation of the same, also broken away. Fig. 3 is a sectional elevation taken on line 3—3 of Fig. 2, with the gear removed. Fig. 4 is a perspective view illustrating the arrangement of chutes whereby the fish are subdivided from a mass into fractional portions thereof. Fig. 5 is a perspective view of a modified form of divided chute.

Like numerals refer to like parts throughout the several views of the drawings.

In the drawings, 5 is a hollow drum consisting of an outer rim 6 provided with perforations 7, 7, said rim having two flanges 8 and 9 projecting inwardly therefrom. The flange 8 has fastened thereto a gear 10 by means of which it may be rotated, said gear and drum being rotatably mounted upon a shaft 11.

A series of buckets 12, 12 adapted to contain fish are arranged around the interior of the drum 5 adjacent to the outer rim 6. These buckets are preferably concavo-convex, the concave side being on the inner side of the bucket or that side in which the fish is deposited. Said buckets are arranged within the drum 5 and extend across the interior of said drum adjacent to the rim 6 from the flange 8 to the flange 9.

A chute 13 leads into the interior of the drum 5 through an annular opening 14, this chute terminating, as clearly shown in Figs. 1 and 2, adjacent to the inner edges of the buckets 12, 12. A guard 15 extends downwardly from the delivery end 16 of the chute 13. This guard 15 is preferably concentric with the drum 5 and is long enough to extend across the edges of two adjacent buckets.

The drum 5 is rotated in the direction of the arrow *a* and the fish are dumped from the buckets 12, 12 onto a chute 17. That portion 18 of the chute 17 located within the drum 5 and constituting an inlet of the chute 17 has inclined sides 19 and 20, as seen in Fig. 2, and vertical front and back plates 21 and 22, respectively, said inlet portion 18 of said chute 17 leading into the portion 23 which is inclined at a slight angle downwardly and preferably has inclined sides 24 and 25 and a rounded bottom portion 26. The width of the chute 23 at the rounded bottom portion 26 is less than the length of the shortest fish which are to be handled by said handling mechanism.

The chutes 13 and 23 are both provided with water by means of suitable pipes 27 and 28, respectively, controlled by valves 29 and 30.

Adjacent to and beneath the outlet end 31 of the chute 23 are located a pair of U-shaped chutes 32 and 33, said U-shaped chutes being divided one from the other by their adjacent sides which form together a partition 34, said partition being substantially vertical and acting as a separator, whereby, as the fish pass out of the end 31 of the chute 23, they are separated into substantially equal portions one of said portions then passing into the chute 32 and the other into the chute 33. The partition 34 being centrally located relatively to the chute 23 or in alinement with a vertical plane bisecting said last-named chute, there is an equal probability of the fish going into either of the chutes 32 or 33, and, as a matter of fact, it has been established by practice that the fish coming down the chute 23 are subdivided into substantially equal portions, one-half going into the chute 32 and the other half into the chute 33. It is evident that the chutes 32 and 33 may be subdivided in the same manner and any number of subdivided chutes may thus be eventually obtained leading to different cutting machines or to different receptacles on a cutting machine or on a flaking machine, or wherever it may be desired to conduct the fish in equal quantities.

The general operation of the mechanism hereinbefore described is as follows: Fish are floated along the chute 13 in mass and flow from the outlet end 16 of said chute into the buckets 12, 12, the drum 5 rotating in the direction of the arrow a, thus bringing said buckets 12 consecutively upward to receive the fish from the outlet end of the chute 13, as illustrated in Fig. 2. When one of these buckets is full and passes upwardly past the outlet end of the chute 13 the fish flow into the next bucket until that is filled and so on. The shield 15 prevents the fish from overflowing the bucket immediately beneath the outlet end of the chute 13 and thus falling into the lower port of the drum and forming a mass of fish in said lower part which would finally overflow through the opening 14. For instance, referring to Fig. 2, the bucket which has just passed by is filled with fish and the fish are then delivered from the chute 13 into the bucket which is just below the outlet end 16 of said chute, and as this bucket passes upwardly and is filled with fish, the next bucket will take its place and be filled with fish. Said buckets are then carried upwardly until they arrive in a position to dump the fish therefrom upon the portion 18 of the chute 17. Said fish then are thus dumped in substantially equal quantities and at equal intervals of time upon the inlet portion 18 of the chute 17 and slide down said inlet portion into the U-shaped portion 23. It will be understood that water is delivered during this operation both to the chute 13, through the pipe 27, and to the chute 23 through the pipe 28, and water flows out through the perforations 7, 7 in the rim of the drum, so that all superfluous water passes away and simultaneously this water, in addition to the floating or moving of the fish, acts to cleanse them, so that the drum 5 acts not only as a segregator or device for separating equal fractional portions of fish from a mass, but also acts as a means for washing the fish and for conveying away the loose scales, blood, dirt and the like. The fish now having been delivered to the chute 23 pass down said chute, which, it will be observed, is slightly inclined, and empty from the outlet end 31 of said chute (see Fig. 4) into the auxiliary chutes 32 and 33, the adjacent sides of said chutes 32 and 33 forming a partition 34 which is located, as hereinbefore described, beneath the outlet end of the chute 23, so that the fish as they pass down the chute 23 are delivered to the chutes 32 and 33 in substantially equal portions.

It will be noted in Fig. 4 that the chutes 32 and 33 are shown as broken away. These chutes in practice are made of great length as compared with their width, the same being oftentimes used in lengths of twenty to twenty-five feet, and the longer said chutes are the better they operate in practice to separate the fish one from another and deliver them one by one from the outlet ends of the chutes. The fish are carried along by the water in these slightly inclined chutes in such a manner that if two of them are side by side, one will force his way ahead, due to the fact that it is very seldom that two fish are exactly the same size and shape and the wedge shape of the fish causes one to force its way ahead of the other in the water, and this, together with the arrangement of the U-shaped conveyers in pairs leading from the outlet end of another conveyer, results in the fish being finally delivered practically one by one to any receptacle or machine desired.

It will be understood that the fish in comparatively large quantities and varying in numbers and in the time of delivery from said chute 13 into the buckets 12 are carried up by the buckets 12 and delivered to the chute 23 in substantially equal numbers and in equal spaces of time. Further it will be understood that as the buckets pass upwardly from the chute 13, the angle of the bucket to a vertical plane, by reason of the rotation of the drum, changes and a portion of the fish in said bucket is dropped off onto the outlet end of the chute 13, so that whereas some buckets may have more in them than others when they first leave the outlet end of the chute 13, each one delivers substantially the same number to the chute 23.

In Fig. 5 I have illustrated a modified form or arrangement of a chute 23 and the divisional chutes 32 and 33, and by reference to said figure it will be seen that the chute 23' delivers the fish into two chutes 32' and 33' which are divided by a partition 34', said partition 34' starting at the bottom of the chute 23' at 34² increasing in height until it forms the partition 34' between the two chutes 32' and 33'. The operation of this divided chute is substantially the same as that illustrated in Fig. 4—that is, a substantially equal number of fish will pass down the divided chutes 32' and 33' from the chute 23', by reason of the partition 34' acting as a dividing means for separating the entire mass of fish coming down the chute 23' into fractional portions thereof which pass down the chutes 32' and 33'. In each of these two forms of divisional chutes illustrated in Figs. 4 and 5, it will be seen however, that the partitions 34 and 34' respectively perform the same function and that the inlet ends of the chutes 32' and 33' are adjacent to the outlet end of the chute 23', although not located directly beneath said outlet end.

Having thus described my invention, what I claim and desire by Letters Patent to secure is:

1. A device for subdividing a mass of fish into fractional portions thereof having, in combination, a hollow rotary drum consisting of an outer rim and two flanges projecting inwardly therefrom, a series of buckets adapted to contain fish arranged around the interior of said drum adjacent to said outer rim and between said flanges, a chute leading into the interior of said drum and adapted to deliver fish into said buckets, a guard extending downwardly from the delivery end of said chute adjacent to and adapted to extend across the inner edges of two adjacent buckets and a chute leading out of said drum into which said buckets are adapted to deliver fish.

2. A device for subdividing a mass of fish into fractional portions thereof having, in combination, a hollow rotary drum consisting of an outer rim and two flanges projecting inwardly therefrom, a series of buckets adapted to contain fish arranged around the interior of said drum adjacent to said outer rim and between said flanges, a chute extending into the interior of said drum and adapted to deliver fish into said buckets in a horizontal direction radial to said drum, and a chute leading out of said drum into which said buckets are adapted to deliver fish.

3. A device for subdividing a mass of fish into fractional portions thereof having, in combination, a hollow rotary drum embodying in its construction an outer rim and two flanges projecting inwardly therefrom, a series of buckets adapted to contain fish arranged around the interior of said drum adjacent to said outer rim and between said flanges, a chute leading into the interior of said drum and terminating in a radially extending portion within said drum with its delivery edge extending adjacent and substantially parallel to the inner edges of said buckets and adapted to deliver fish toward the said rim and into said buckets and a chute leading out of the interior of said drum into which said buckets are adapted to deliver fish.

4. A device for subdividing a mass of fish into fractional portions thereof having, in combination, a hollow rotary drum consisting of an outer rim and two flanges projecting inwardly therefrom, a series of buckets adapted to contain fish arranged around the interior of said drum adjacent to said outer rim and between said flanges, a chute leading into the interior of said drum and terminating in a radially extending portion within said drum with its delivery edge extending adjacent and substantially parallel to the inner edges of said buckets and adapted to deliver fish toward said rim and into said buckets, a guard extending downwardly from the delivery end of said chute adjacent to and adapted to extend across the inner edges of two adjacent buckets and a chute leading out of the interior of said drum into which said buckets are adapted to deliver fish.

In testimony whereof I have hereunto set my hand in presence of two subscribing witnesses.

FRANCIS D. CLEVELAND.

Witnesses:
CHARLES S. GOODING,
SYDNEY E. TAFT.